(No Model.)

J. F. TITUS.
NUT LOCK.

No. 603,670.                    Patented May 10, 1898.

Witnesses
Jos. Gregory
R. A. Nau

Inventor
John F. Titus
By John Wedderburn
his Attorney

UNITED STATES PATENT OFFICE.

JOHN F. TITUS, OF BOONE COUNTY, INDIANA.

NUT-LOCK.

SPECIFICATION forming part of Letters Patent No. 603,670, dated May 10, 1898.

Application filed April 9, 1896. Serial No. 586,516. (No model.)

*To all whom it may concern:*

Be it known that I, JOHN F. TITUS, a citizen of the United States, residing in the county of Boone and State of Indiana, have invented certain new and useful Improvements in Nut-Locks; and I do hereby declare the following to be a full, clear, and exact description of the invention, such as will enable others skilled in the art to which it appertains to make and use the same.

This invention relates to certain new and useful improvements in nut-locks; and it has for its object, among others, to provide a simple and cheap construction of lock for use upon railroad-rails, fish-plates, bridgework, and all other places where it is desirable to provide means for preventing the working loose of nuts on the bolts. The nut is provided with notches or teeth, and a spring held in a slit in the end of the bolt has a portion engaging the said teeth or notches, the spring pulling on the bolt one way and the nut in the opposite direction, which serves to at all times tighten the nut, yet with a yielding pressure, so as to compensate for any sudden shock.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1:
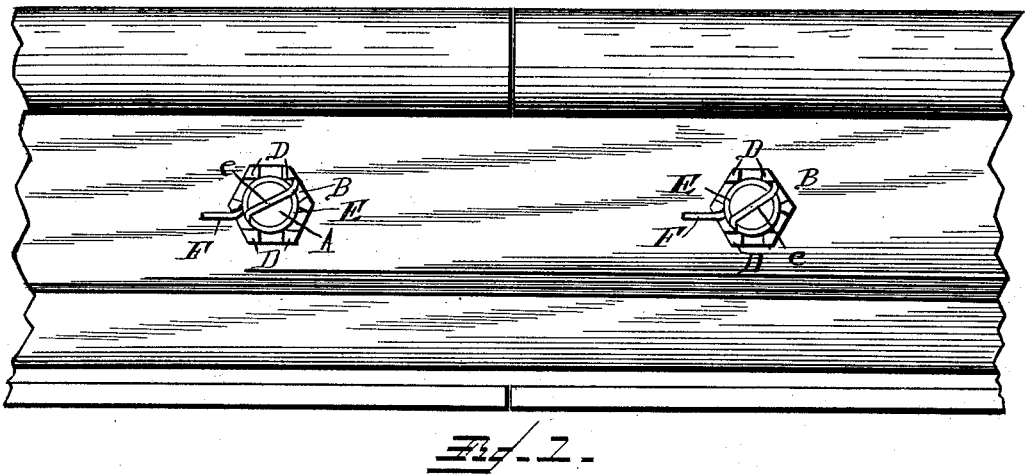
Figure 2:
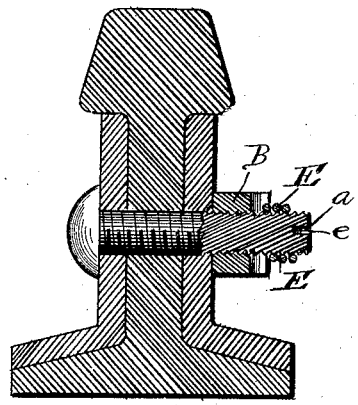
Figure 3:
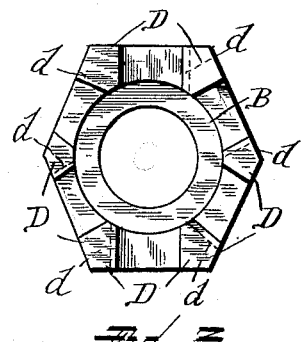

Figure 1 is a view showing the application of the invention. Fig. 2 is a sectional view of the same. Fig. 3 is an end view thereof.

Like letters of reference indicate like parts throughout the several views.

Referring now to the details of the drawings by letter, A designates a bolt, and B a nut therefor. The end of the bolt is formed with a slit $a$ to receive a portion of the spring, as will hereinafter appear.

The nut is formed with a plurality of notches or teeth D on its outer face and with a recess or cavity $d$, into which the spring is received.

E is the spring. It is formed with a plurality of coils, as shown, and has one end turned across the center, as seen at $e$, and which portion is designed to be received in the slit in the end of the bolt, while the other end is extended outward, as shown at F, to form a lock to engage the notches or teeth of the nut.

In practice the nut is applied to the bolt in the usual way, and then the spring is applied by slipping it over the end of the bolt and into the recess or cavity in the outer end of the nut, with the portion $e$ in the slit in the end of the bolt, and the end F, which is nearest said cavity, extends outward, so as to engage the notches or teeth of the nut. This allows the nut to be turned up or on the bolt, but prevents its retrograde movement. The spring pulls on the bolt one way and the nut the other way, which serves to tighten the nut and prevent any possibility of its becoming loose.

What is claimed as new is—

The combination with a bolt having a slit extended across its end, of a nut having a plurality of notches on its outer face and a recess or cavity, and a spring having a plurality of coils adapted to be received in said cavity, one end of the spring being turned across the center of said coils and adapted to be received in the slit in the end of the bolt, and the other end of said spring extended outwardly and at an angle to the first-mentioned end and adapted to engage the notches of the nut, all substantially as herein shown and described.

In testimony whereof I have signed this specification in the presence of two subscribing witnesses.

JOHN F. TITUS.

Witnesses:
JOHN WHITAKER,
MILFORD A. KINGSOLVER.